(No Model.)
G. W. ROBINSON.
SAW MILL CARRIAGE.
No. 348,295. Patented Aug. 31, 1886.
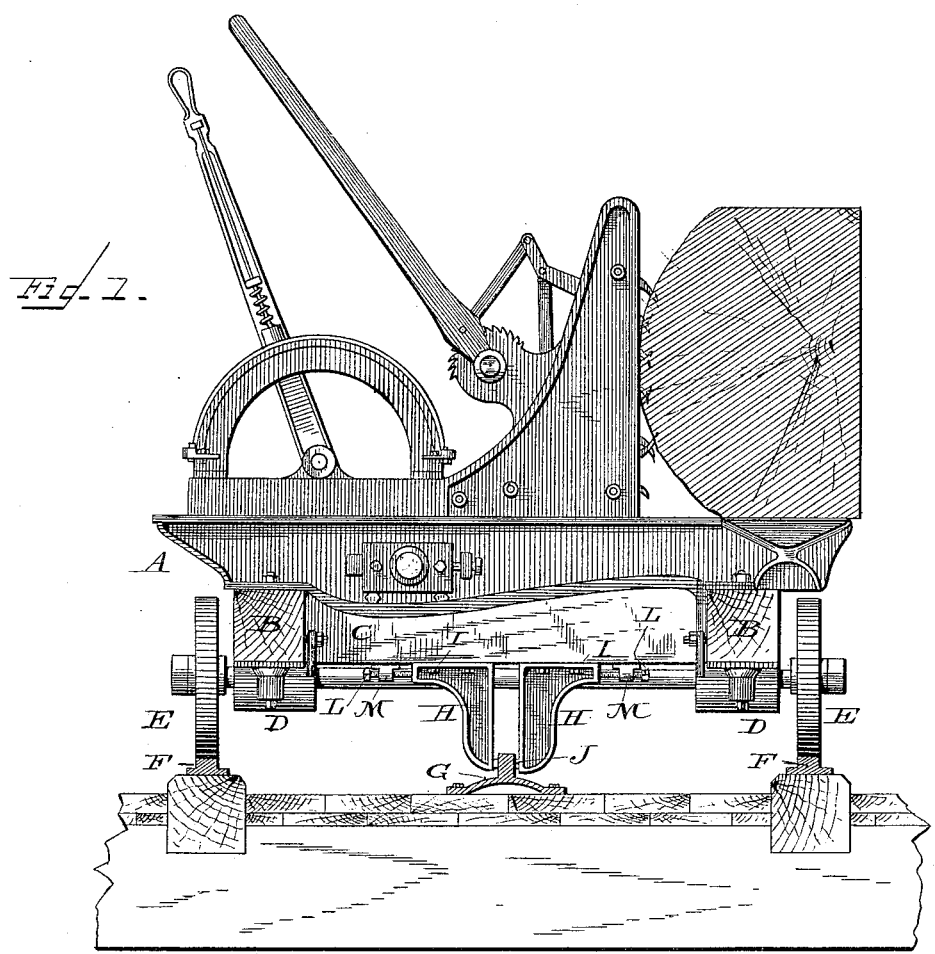
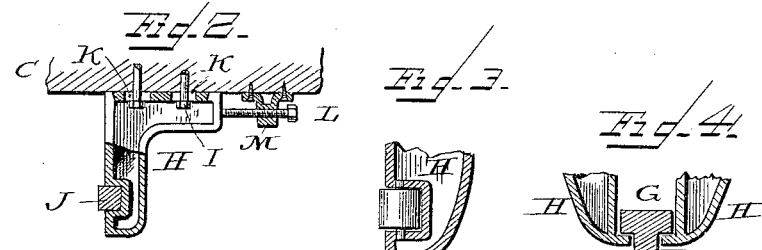
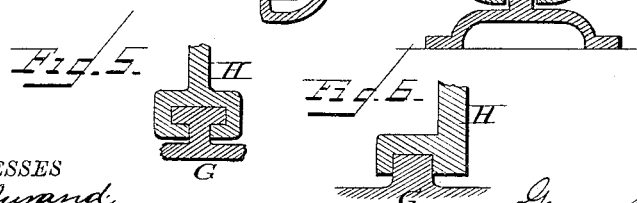
WITNESSES
F. L. Durand
Walter S. Dodge
INVENTOR,
George W. Robinson
by Dodge & Son
his Attorneys.

UNITED STATES PATENT OFFICE.

GEORGE W. ROBINSON, OF PENSACOLA, FLORIDA, ASSIGNOR OF ONE-THIRD TO EDWARD P. ALLIS, OF MILWAUKEE, WISCONSIN.

SAW-MILL CARRIAGE.

SPECIFICATION forming part of Letters Patent No. 348,295, dated August 31, 1886.

Application filed April 17, 1886. Serial No. 199,250. (No model.)

*To all whom it may concern:*

Be it known that I, GEORGE W. ROBINSON, of Pensacola, in the county of Escambia and State of Florida, have invented certain new and useful Improvements in Saw-Mill Carriages, of which the following is a specification.

My invention relates to saw-mill carriages; and it consists in a novel construction and arrangement of the guiding devices thereof, all as hereinafter set forth.

Figure 1 of the accompanying drawings is a vertical transverse section of a saw-mill carriage with my improvements applied; Fig. 2, a detail view, and Figs. 3, 4, 5, and 6 views illustrating certain modifications.

A indicates a saw-mill carriage comprising the longitudinal timbers B, cross-timbers C, truck-boxes D, and wheels E, all of which parts may be of any usual and well-known construction, and as they form no part of the present invention they need not be further described.

The carriage runs upon rails F, and between the rails and parallel therewith is placed a guiding-rail, G, as shown in Figs. 1 and 4, said guide-rail being securely bolted to the floor, as shown. The guiding-rail extends upward into or between the faces of brackets H, secured to the under face of the carriage or to the head-blocks by means of bolts I, as clearly shown in Fig. 2. These brackets H are advisably made hollow, and cast with sockets in their front faces, in which are secured blocks J, of wood, preferably lignum-vitæ, which latter run in contact with the upright side walls of the guiding-rail G. Instead of using a block, J, an anti-friction roller may be substituted, such construction being illustrated in Fig. 3.

The brackets H, where the bolts I pass through them, are provided with elongated slots K, which allow the brackets to be adjusted to and from the guiding-rail G, by means of a set-screw, L, journaled in a lug, M, secured to the carriage, the screw bearing at its end against the rear of the bracket, as shown in Figs. 1 and 2. By means of this screw L the brackets may be set up toward the guiding-rail G, to compensate for wear, to insure alignment of the brackets, and to maintain the carriage in proper relative position to the saw.

To further insure the proper movement of the carriage, the guiding-rail may be flanged, as shown in Figs. 4 and 5; and it will also be seen that instead of making the brackets in two parts they may be formed in a single piece, as shown in Figs. 5 and 6. The flanging or grooving of the guiding-rail is a matter of choice in all cases.

Under the construction above set forth I am enabled to dispense with the grooved track and wheels, such as are usually employed in connection with saw-mill carriages, to guide the latter in their movements, and hence require less power to move the carriage, as the latter has flat wheels, instead of the grooved ones, which tend to wedge and produce friction.

The guiding-rail is not designed to receive any weight whatever, but is merely used to prevent lateral play or movement of the carriage.

If desired, the brackets may be secured at intervals upon the floor, and the guiding-rail secured to the carriage, this plan being simply a reversal of that shown in Figs. 1, 4, 5, and 6.

It will be observed that instead of placing the guiding-rail between the truck-wheels, it may be placed outside of them, parallel with the rear timbers of the carriage.

I am aware that it has long been the practice to guide locomotives and other vehicles by means of a bracket engaging with a guiding-rail placed between the main rails, and I do not wish to be understood as claiming such an idea, broadly.

By my device I am enabled to maintain the face of the head-blocks at all times parallel with the saw, thus insuring at all times a straight cut. By making the brackets adjustable upon the carriage I am enabled to compensate for wear in the journal-boxes and to insure an accurate travel of the carriage past the saw.

Having thus described my invention, what I claim is—

1. In combination with a saw and a saw-mill carriage movable past the saw, wheels for supporting said carriage, a guiding-rail parallel with the saw, brackets secured to the carriage to engage with the guiding-rail, the brackets being adjustable independently of each other.

2. In combination with a saw-mill carriage and a guiding-rail therefor, brackets H, secured to the carriage and adjustable to and from the guiding-rail.

3. In combination with a saw-mill carriage and a guiding-rail therefor, brackets H, provided with elongated slots K, bolts I, passing through said slots and securing said brackets in place, a lug, M, and a screw, L, passing through the lug and bearing against the bracket H, as and for the purpose set forth.

GEORGE W. ROBINSON.

Witnesses:
J. S. LEONARD,
F. C. BRENT.